US012407001B2

(12) United States Patent
You et al.

(10) Patent No.: US 12,407,001 B2
(45) Date of Patent: Sep. 2, 2025

(54) FUEL CELL CATALYST, METHOD FOR PREPARING THE SAME, AND FUEL CELL COMPRISING THE SAME

(71) Applicants: HYUNDAI MOTOR COMPANY, Seoul (KR); Kia Corporation, Seoul (KR); KOREA INSTITUTE OF SCIENCE AND TECHNOLOGY, Seoul (KR)

(72) Inventors: Eun Young You, Yongin-si (KR); Yun Sik Kang, Seongnam-si (KR); Dae Jong You, Hwaseong-si (KR); Sung Chul Lee, Yongin-si (KR); Sung Jong Yoo, Seoul (KR); Se Hyun Lee, Seoul (KR); Jue Hyuk Jang, Seoul (KR); Eung Jun Lee, Seoul (KR)

(73) Assignees: HYUNDAI MOTOR COMPANY, Seoul (KR); Kia Corporation, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 511 days.

(21) Appl. No.: 17/895,639

(22) Filed: Aug. 25, 2022

(65) Prior Publication Data
US 2023/0077033 A1    Mar. 9, 2023

(30) Foreign Application Priority Data

Aug. 30, 2021    (KR) ........................ 10-2021-0114866

(51) Int. Cl.
    *H01M 4/92*      (2006.01)
    *H01M 4/88*      (2006.01)

(52) U.S. Cl.
    CPC ......... *H01M 4/925* (2013.01); *H01M 4/8882* (2013.01)

(58) Field of Classification Search
CPC ........ H01M 4/925; H01M 4/921; H01M 4/92; H01M 4/926; H01M 4/928; H01M 4/9075; H01M 4/9041; H01M 4/8882
See application file for complete search history.

(56) References Cited

U.S. PATENT DOCUMENTS

2017/0214060 A1    7/2017   Kitao et al.
2019/0221858 A1*   7/2019   Hashimoto ........... H01M 4/926
(Continued)

FOREIGN PATENT DOCUMENTS

JP       2015-213036 A    11/2015
KR    10-2013-0123217 A    11/2013

OTHER PUBLICATIONS

Choi, Juhyuk, et al., "Au-doped PtCo/C catalyst preventing Co leaching for proton exchange membrane fuel cells", Applied Catalysis B: Environmental 247 (2019): 142-149.
(Continued)

*Primary Examiner* — Raymond Alejandro
(74) *Attorney, Agent, or Firm* — MORGAN, LEWIS & BOCKIUS LLP

(57) ABSTRACT

A fuel cell catalyst including a conductive carrier and core-shell nanoparticles supported on the carrier. The core includes platinum and a transition metal and the shell includes a secondary metal. An electrochemical specific activity measured at a voltage of 0.05 V to 1.05 V (vs. RHE) in a potential range, at a scan rate of 5 mV/s and a rotation rate of 1,600 rpm in an $O_2$-saturated 0.1 M $HClO_4$ electrolyte solution is 0.3 mA/cm2 to 0.6 mA/cm2, and a mass activity is 0.05 mA/µg to 0.08 mA/µg.

7 Claims, 19 Drawing Sheets

(56) References Cited

U.S. PATENT DOCUMENTS

2020/0313214 A1* 10/2020 Monnier ............. H01M 8/1011
2021/0184228 A1*  6/2021 Nagamori ........... H01M 8/1018

OTHER PUBLICATIONS

Extended European search report issued on Jan. 4, 2023, in counterpart European Patent Application No. 22192579.5 (9 pages in English).
Office Action issued in corresponding Chinese Patent Application No. 2022110527237 issued Apr. 30, 2025, with English translation.

* cited by examiner

FUEL CELL CATALYST, METHOD FOR PREPARING THE SAME, AND FUEL CELL COMPRISING THE SAME

CROSS-REFERENCE TO RELATED APPLICATIONS

This application claims the priority of Korean Patent Application No. 10-2021-0114866 filed on Aug. 30, 2021 in the Korean Intellectual Property Office, the disclosure of which is incorporated herein by reference.

BACKGROUND

Field of the Invention

The present invention relates to a fuel cell catalyst having increased electrochemical active surface area and high mass activity, a method for preparing the same, and a fuel cell comprising the same.

Description of the Related Art

A fuel cell, which has been spotlighted as a next-generation energy source, is an electrochemical device that converts chemical energy generated by oxidation/reduction of fuel into electric energy, and is recently expected to be a future type electric power source for transportation such as an electric vehicle and for power supply at home.

The electrode reaction in the fuel cell consists of a hydrogen oxidation reaction in a negative electrode ("anode" or "oxidation electrode") and an oxygen reduction reaction in a positive electrode ("cathode" or "reduction electrode"), and in order for these electrochemical reactions to actually occur smoothly in a fuel cell system driven at a low temperature such as a polymer electrolyte membrane fuel cell, the reaction rate should be effectively increased.

For this reason, platinum (Pt), a precious metal catalyst, is inevitably used in the fuel cell system. However, the platinum catalyst is very expensive and has limited reserves despite the excellent energy conversion efficiency, and thus may be an obstructive factor in the commercialization of fuel cells. Therefore, solving the high prices and the limitation of reserves of platinum is a way to maximize the efficiency of the commercialization of fuel electricity.

Accordingly, recently, a platinum-transition metal alloy catalyst has been studied to reduce the amount of platinum used and to increase performance, but there is a limitation in that the transition metal is easily eluted under the fuel cell driving conditions, thereby reducing performance, and as a part of solving the limitation, a technology of replacing the transition metal on the surface of the alloy nanoparticles with a secondary metal suitable for the fuel cell driving conditions has been studied.

However, since the replacement of the transition metal on the surface is performed at the atomic level, the reaction conditions are very strict and it is difficult to replace it effectively. In addition, since galvanic replacement gradually induces replacement reaction between a metal having a relatively low standard reduction potential and a metal having a relatively high standard reduction potential using an intrinsic standard reduction potential of metal, it is advantageous to effectively express atomic level replacement, but since a secondary metal having a high standard reduction potential has excellent reduction power, there is a limitation in that the secondary metal exists as independent nanoparticles (crystals) on the surface of a catalyst.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present invention provides a fuel cell catalyst having high mass activity due to an increase in the active area of an electrochemical reaction, which is produced by a production method through a galvanic replacement reaction including a removal step of a secondary metal on the surface or a galvanic replacement reaction including a pretreatment step.

Another aspect of the present invention provides a method for preparing the fuel cell catalyst.

Another aspect of the present invention provides a fuel cell including the fuel cell catalyst.

In one general aspect, a fuel cell catalyst includes a conductive carrier and core-shell nanoparticles supported on the carrier. The core includes platinum and a transition metal, and the shell includes a secondary metal. An electrochemical specific activity measured at a voltage of 0.05 V to 1.05 V (vs. RHE) in a potential range, at a scan rate of 5 mV/s and a rotation rate of 1,600 rpm in an $O_2$-saturated 0.1 M $HClO_4$ electrolyte solution is 0.3 mA/cm2 to 0.6 mA/cm2, and a mass activity is 0.05 mA/μg to 0.08 mA/μg.

The transition metal may be one or more selected from the group consisting of cobalt (Co), nickel (Ni), copper (Cu), and iron (Fe).

The secondary metal may be one or more selected from the group consisting of silver (Ag), gold (Au), palladium (Pd), and iridium (Ir).

The conductive carrier may be one or more selected from the group consisting of carbon black, Ketjen black, and metal oxide.

The core-shell nanoparticles may have a diameter of 3 nm to 6 nm and the shell may have a thickness of 0.3 nm to 1.0 nm.

The fuel cell catalyst may have an electrochemical specific activity of 0.4 $mA/cm^2$ to 0.6 $mA/cm^2$ and a mass activity of 0.06 mA/μg to 0.08 mA/μg measured at a voltage of 0.05 V to 1.05 V (vs. RHE) in a potential range, at a scan rate of 5 mV/s and a rotation rate of 1,600 rpm in an $O_2$-saturated 0.1 M $HClO_4$ electrolyte solution.

In another general aspect, a method for preparing a fuel cell catalyst includes: preparing a core-carrier particle dispersion solution by dispersing, in an organic solvent, core-carrier particles in which a core containing platinum and a transition metal is supported on a conductive carrier and stirring the dispersed solution under a reducing gas atmosphere (S1); creating a mixture by performing a galvanic replacement reaction by mixing the core-carrier particle dispersion solution with a secondary metal precursor solution (S2); and washing and drying the mixture and then heat-treating under a reducing gas atmosphere (S3). Performing the galvanic replacement reaction includes: preparing the core-carrier particle dispersion solution into an acidic dispersion solution having a pH of 2 to 5 and then stirring and mixing the solution with a secondary metal precursor solution (S2-1); or preparing a core-shell nanoparticle-containing dispersion solution by stirring and mixing the core-carrier particle dispersion solution with the secondary metal precursor solution and then washing and drying the core-shell nanoparticle-containing dispersion solution and then heat-treating to prepare primary core-shell nanoparticles, and then dispersing the primary core-shell nanoparticles in an acidic solution having a pH of 2 to 5 (S2-2).

The core-carrier particles may be prepared by mixing and reacting an organic solution in which a conductive carrier is dissolved, and a metal precursor organic solution in which a platinum precursor and a transition metal precursor are dissolved, and washing and drying the mixture.

The dispersion in (S1) may be performed through an ultrasonic treatment.

The acidic dispersion solution in (S2-1) may be prepared by adding an acid to the core-carrier particle dispersion solution under a reducing gas atmosphere.

The secondary metal precursor solution in (S2) may be prepared by dissolving the secondary metal precursor in an organic solvent, and the secondary metal precursor may be one or more compounds selected from the group consisting of a nitride, a chloride, a sulfide, an acetate, an acetylacetonate, a cyanide, and a hydrate of the secondary metal.

The stirring and mixing in (S2-1) and (S2-2) may be performed by stirring the solution for 12 hours to 24 hours.

The acidic solution in (S2-2) may be a solution in which acetic acid is dissolved in alcohol in 1 M to 3 M.

The heat-treating in (S3) may be performed at 300° C. to 900° C. in a reducing gas atmosphere.

In another general aspect, a fuel cell including: a positive electrode; a negative electrode facing the positive electrode; and an electrolyte membrane located between the positive electrode and the negative electrode, wherein at least one among the positive electrode and the negative electrode includes the fuel cell catalyst.

Other features and aspects will be apparent from the following detailed description, the drawings, and the claims.

BRIEF DESCRIPTION OF THE DRAWINGS

The above and other aspects, features and other advantages of the present invention will be more clearly understood from the following detailed description taken in conjunction with the accompanying drawings, in which:

FIG. 1A is a HAADF-STEM image. FIG. 1B is a Pt EDX element map. FIG. 1C is an Ag EDX element map. And FIG. 1D is a Pt—Co/Ag EDX element map.

FIG. 2A is a HAADF-STEM image. FIG. 2B is a Pt EDX element map. FIG. 2C is an Ag EDX element map. And FIG. 2D is a Pt/Ag EDX element map.

FIG. 3A is a HAADF-STEM image. FIG. 3B is a Pt EDX element map. FIG. 3C is an Au EDX element map. And FIG. 3D is a Pt/Au EDX element map.

FIG. 4A is a HAADF-STEM image. FIG. 4B is a Pt EDX element map. FIG. 4C is an Au EDX element map. And FIG. 4D is a Pt/Au EDX element map;

DETAILED DESCRIPTION

Figure 1A:
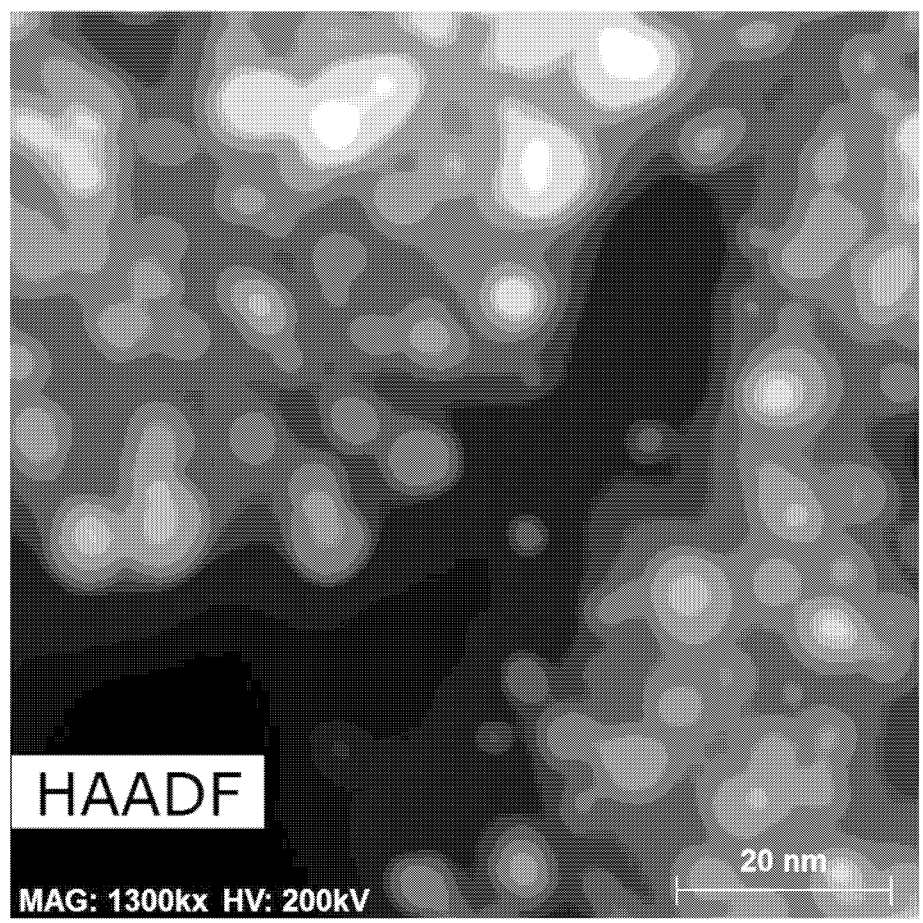
FIG. 1A-1D are TEM images of a fuel cell catalyst of Example 1.
Figure 1B:
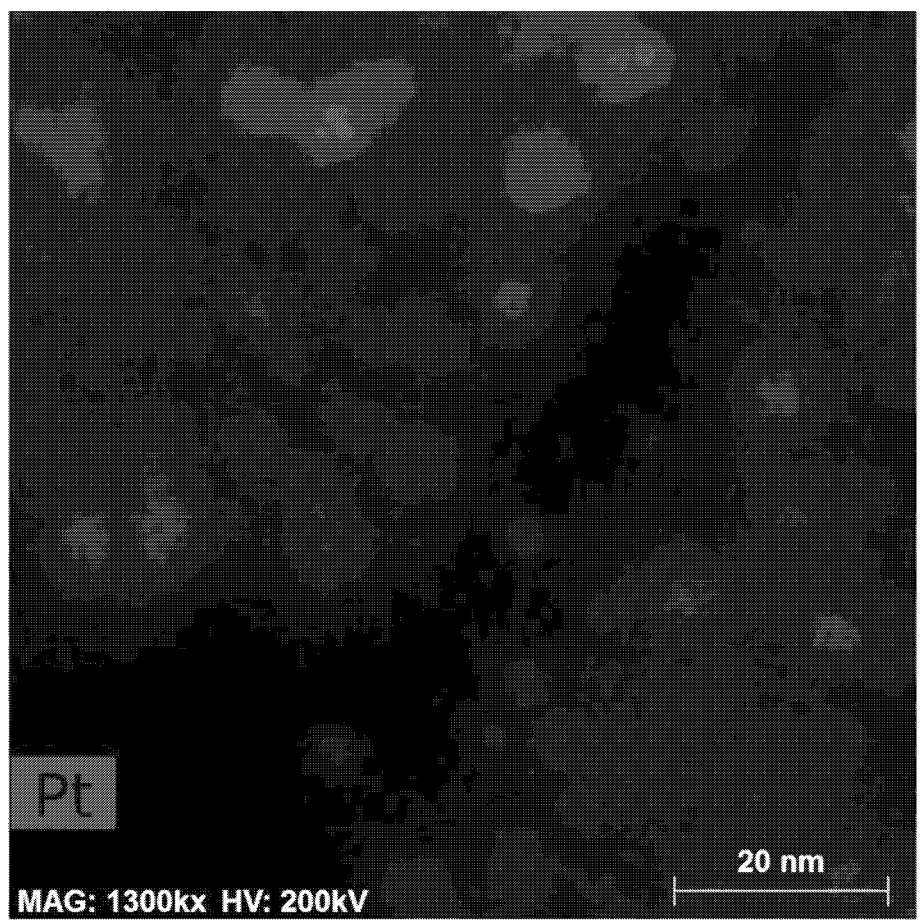
Figure 1C:
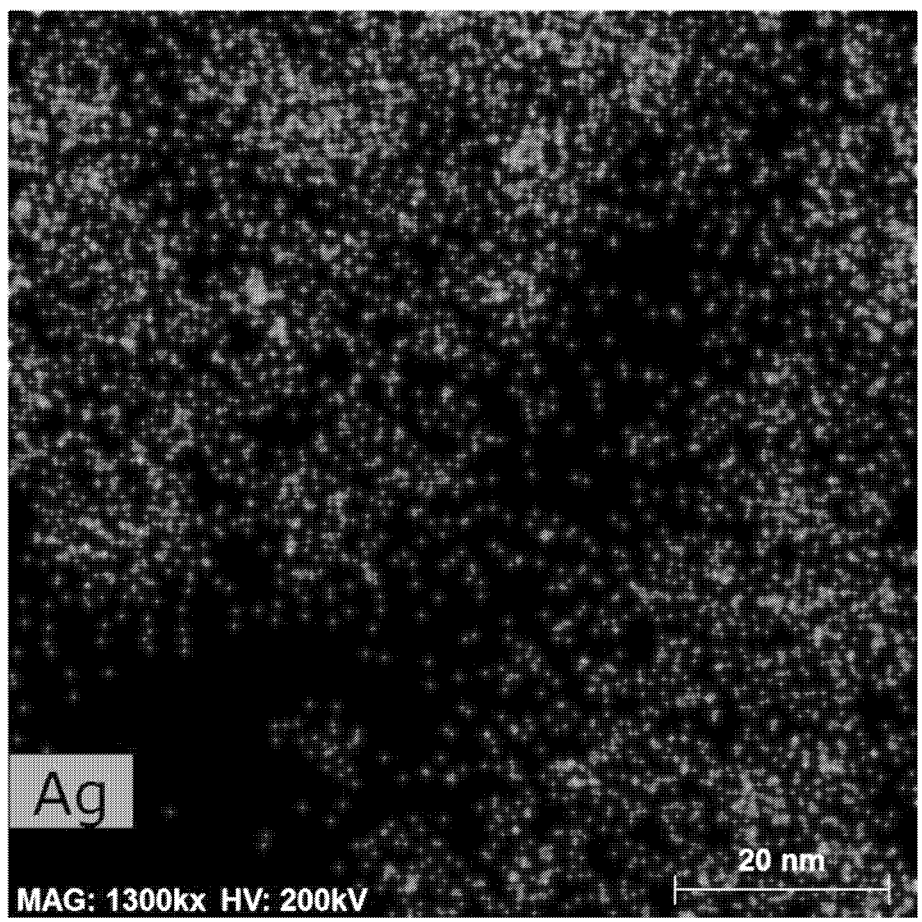
Figure 1D:
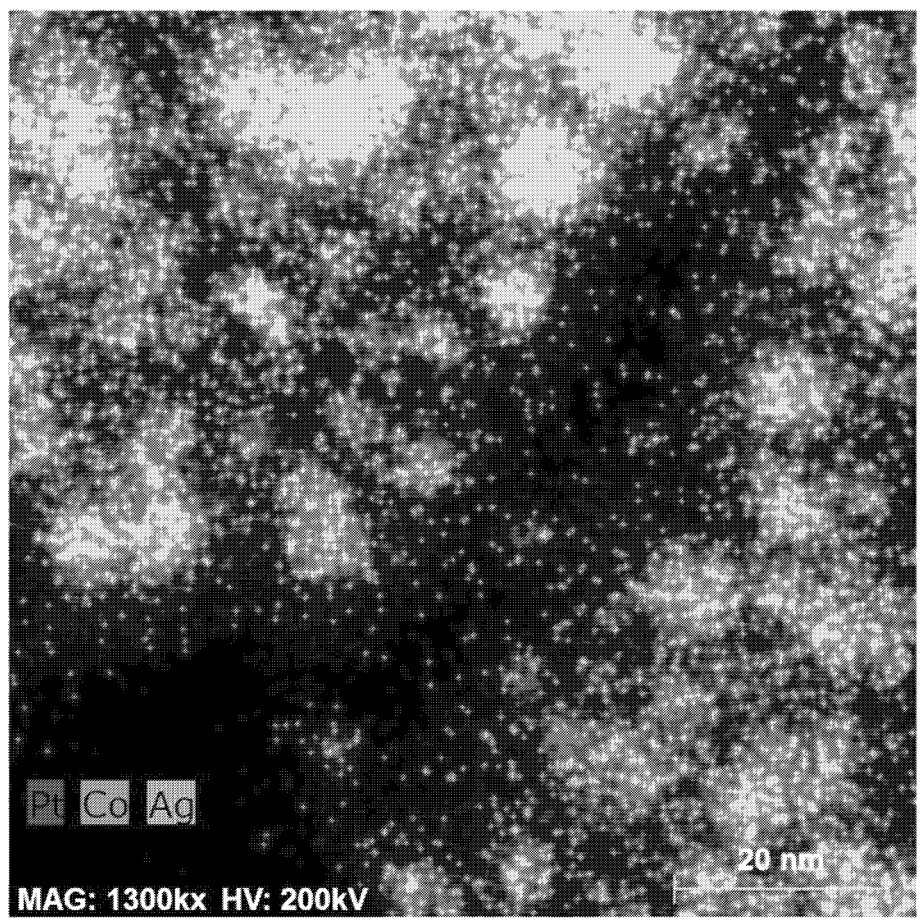
Figure 2A:
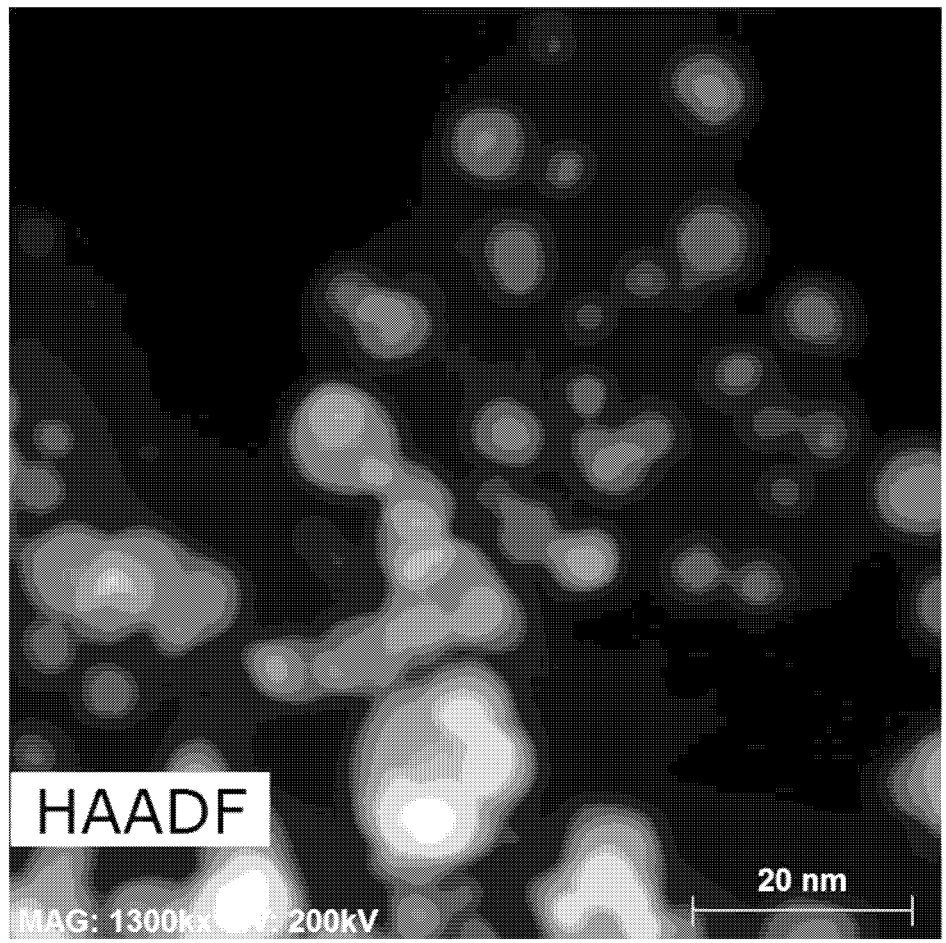
FIG. 2A-2D are TEM images of a fuel cell catalyst of Comparative Example 1.
Figure 2B:
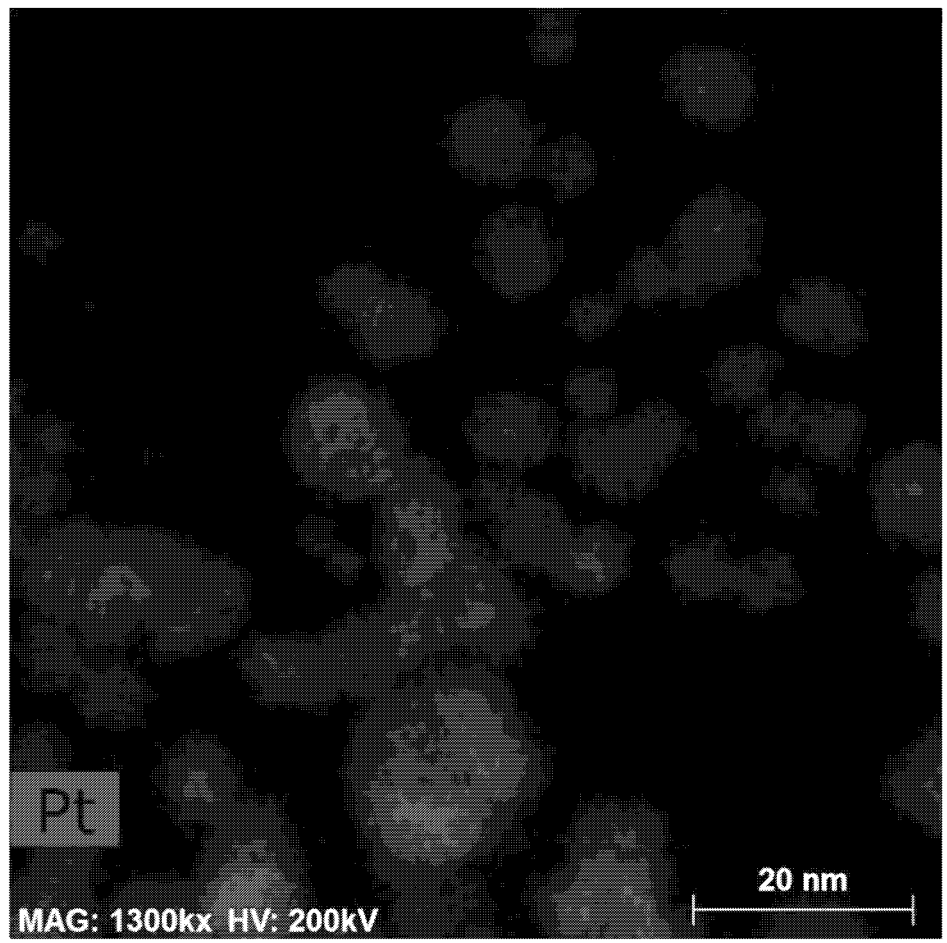
Figure 2C:
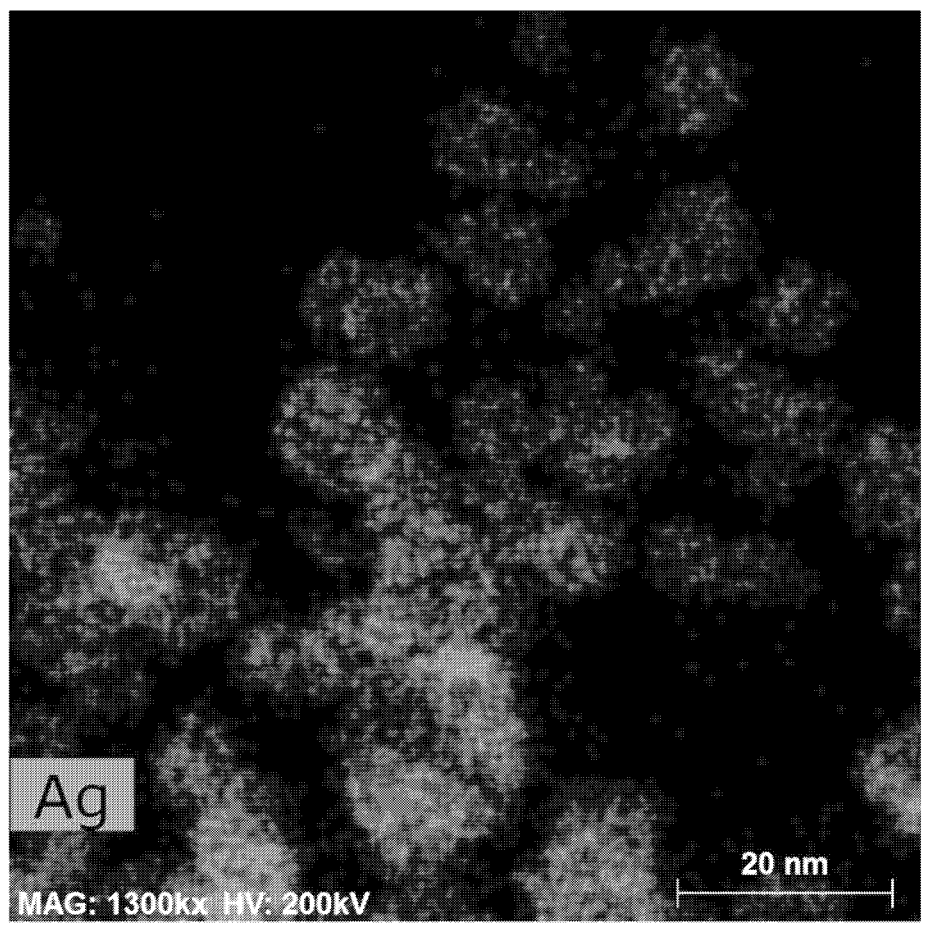
Figure 2D:
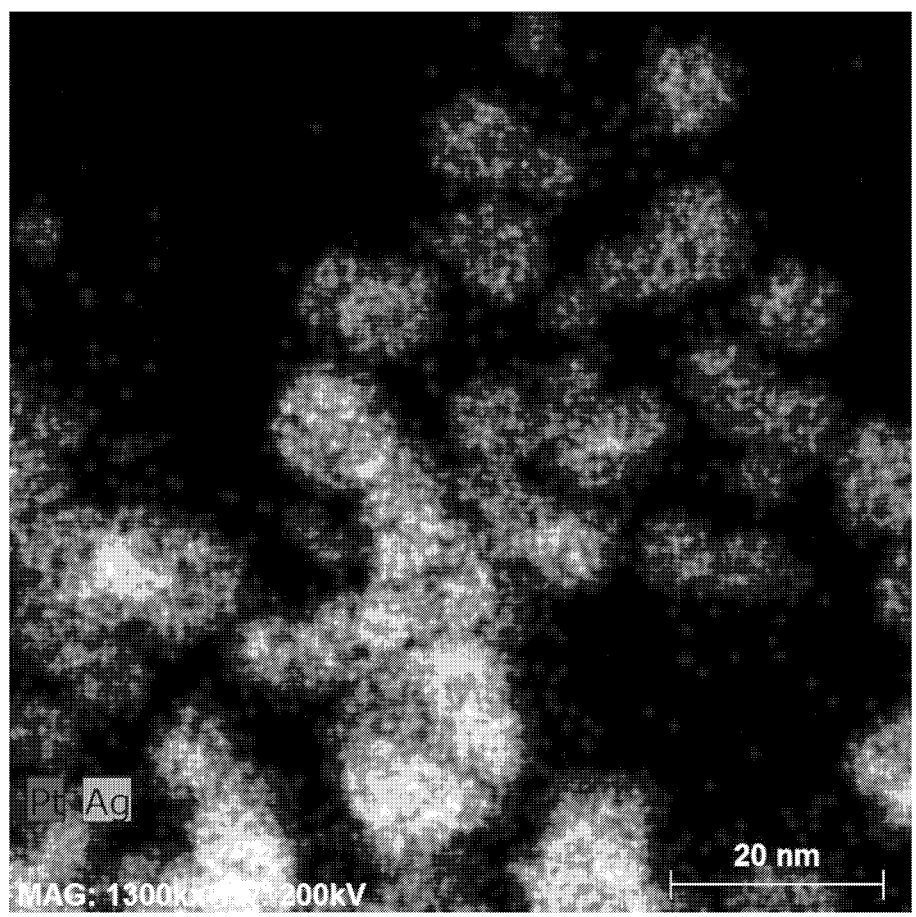
Figure 3A:
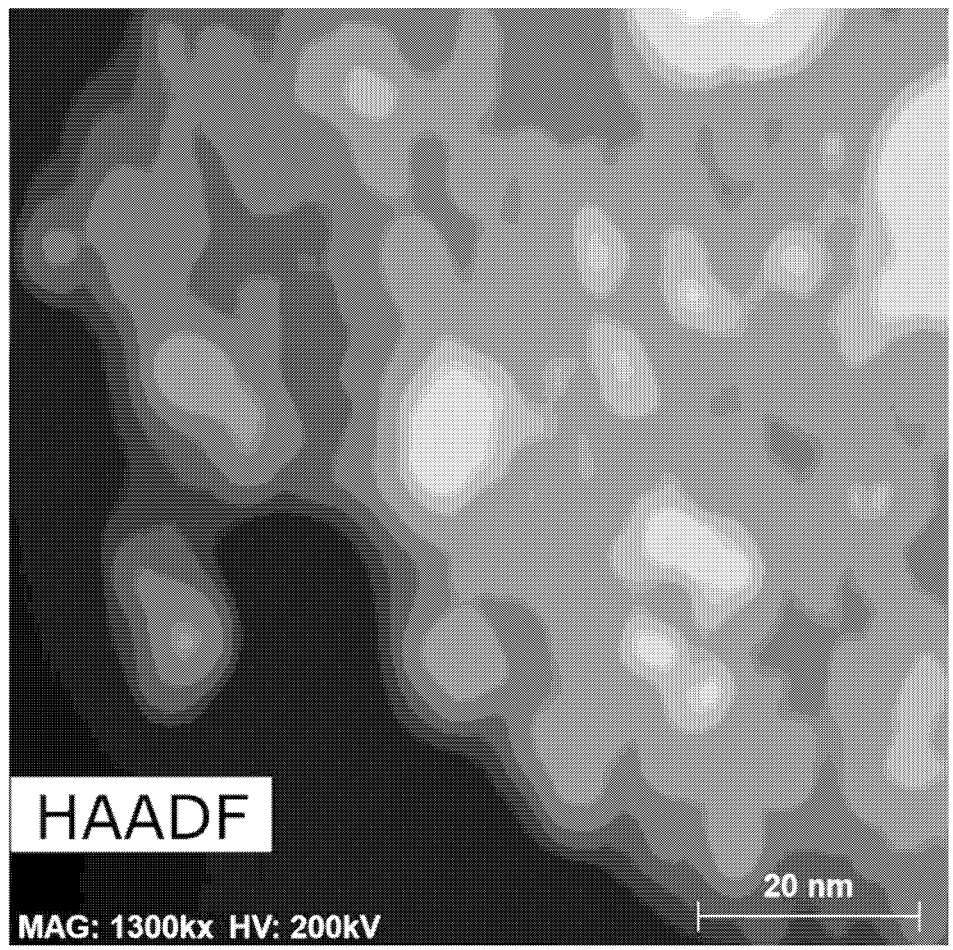
FIG. 3A-3D are TEM images of a fuel cell catalyst of Example 2.
Figure 3B:
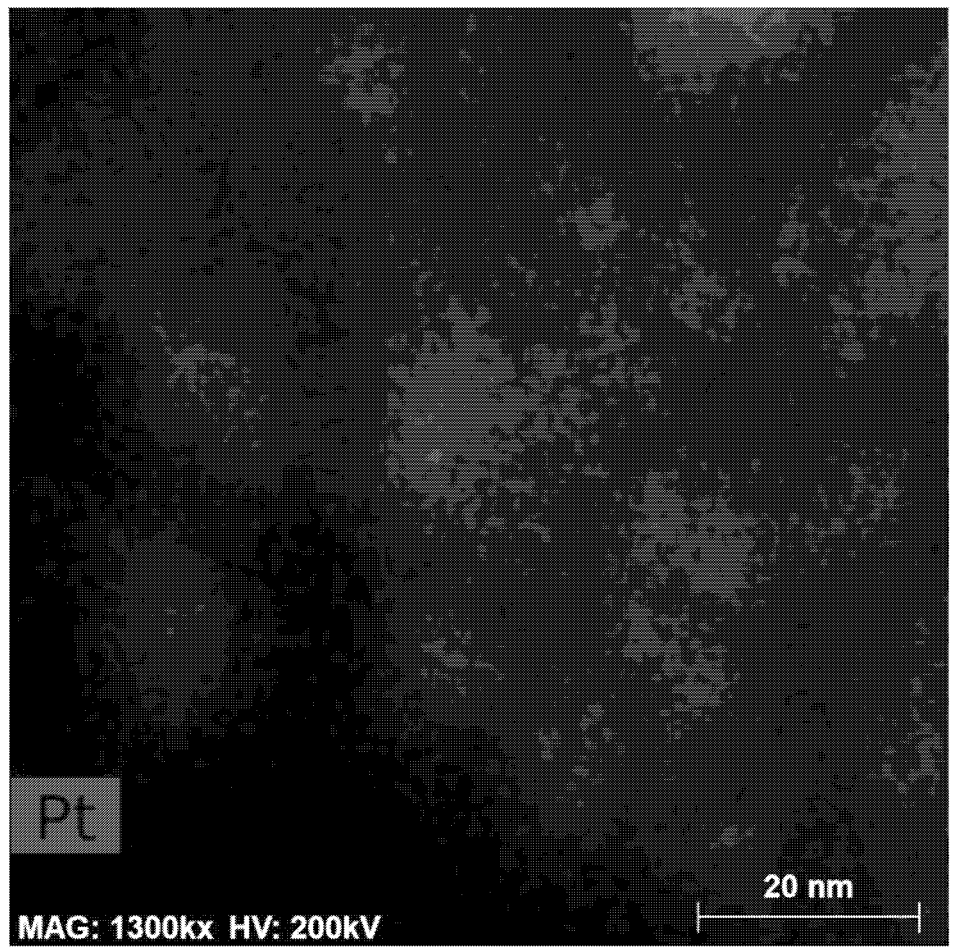
Figure 3C:
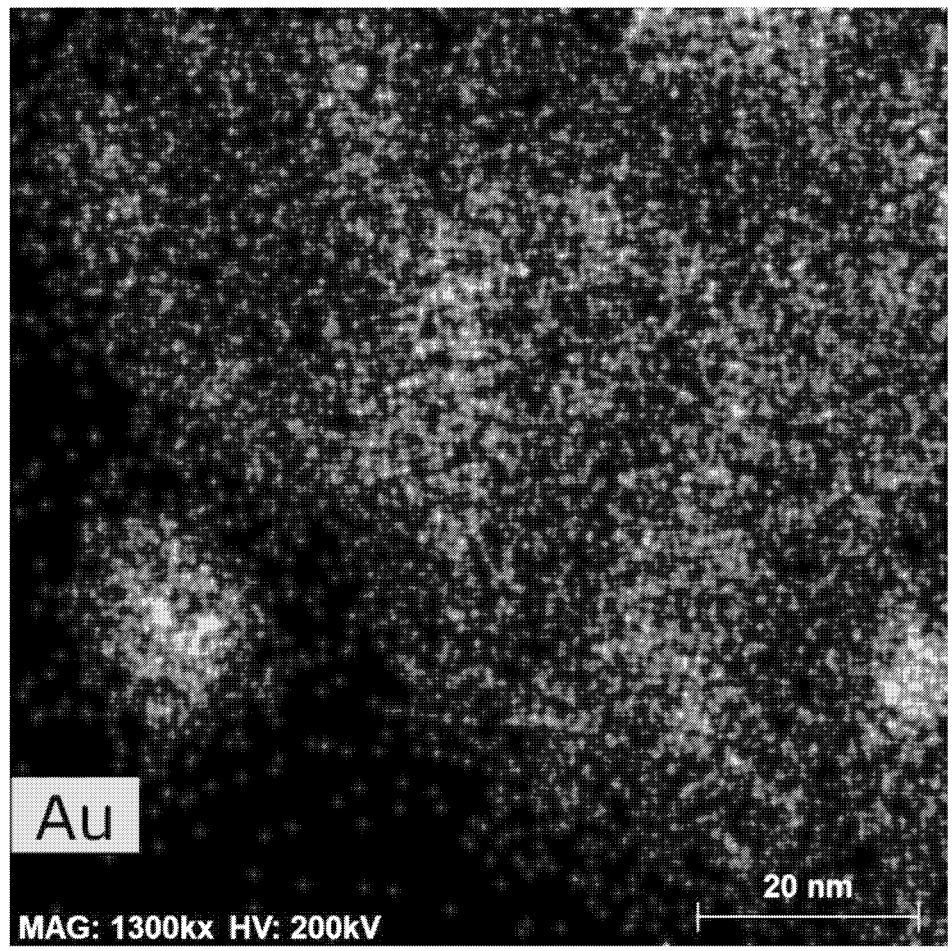
Figure 3D:
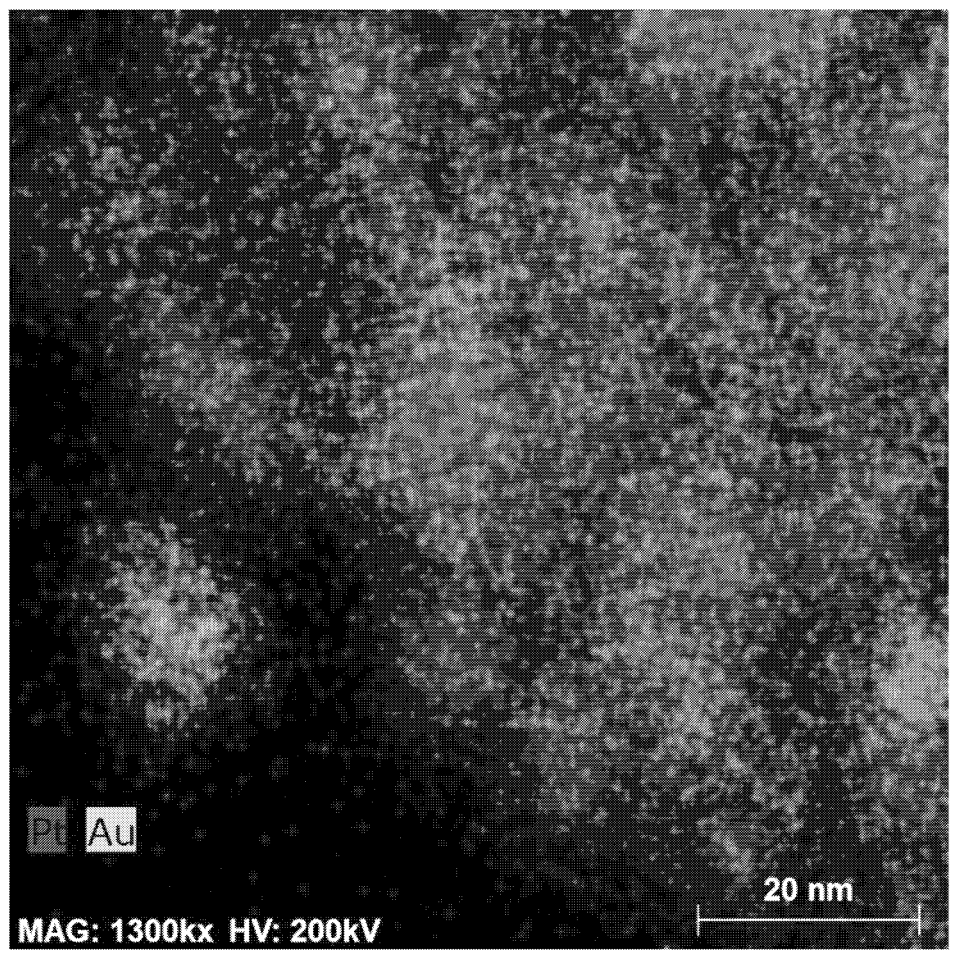
Figure 4A:
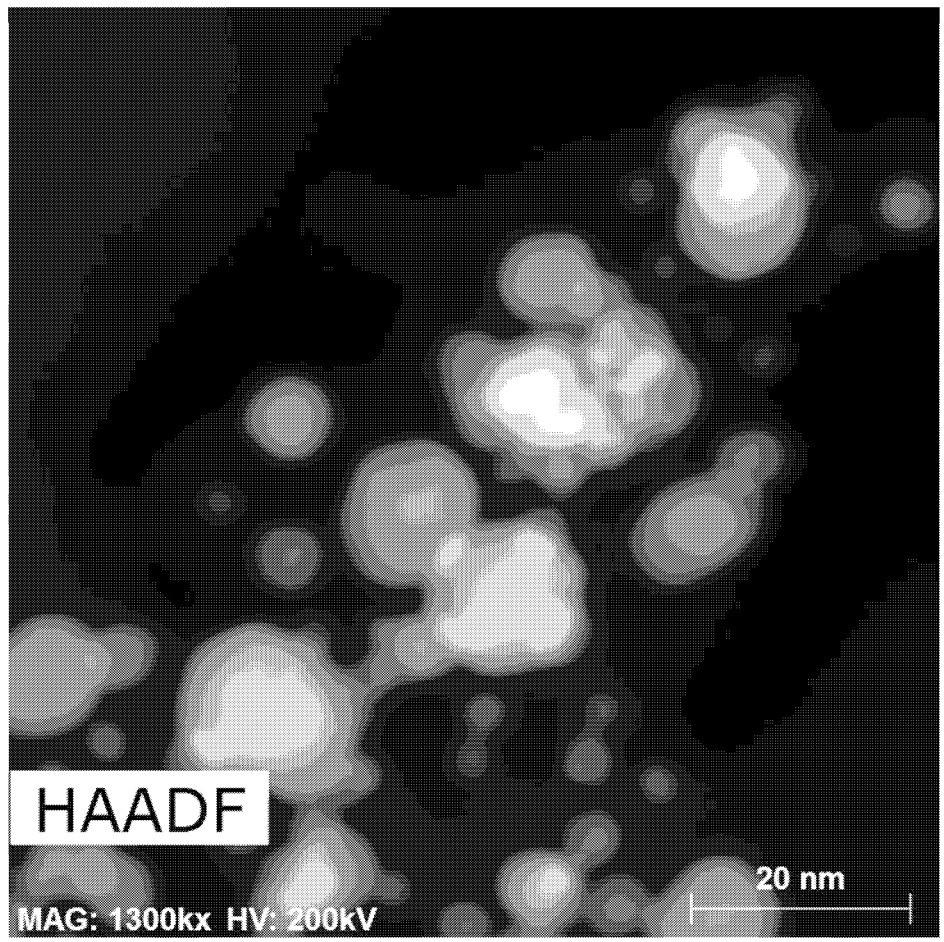
FIG. 4A-4D are TEM images of a fuel cell catalyst of Comparative Example 2.
Figure 4B:
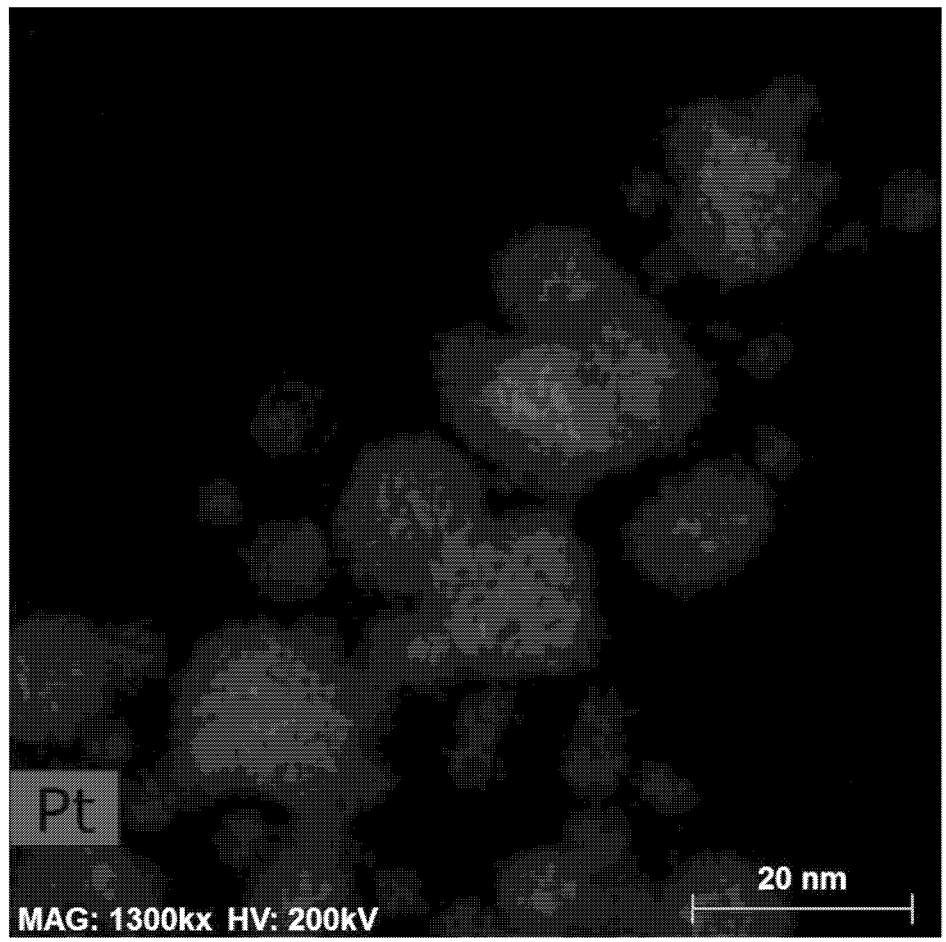
Figure 4C:
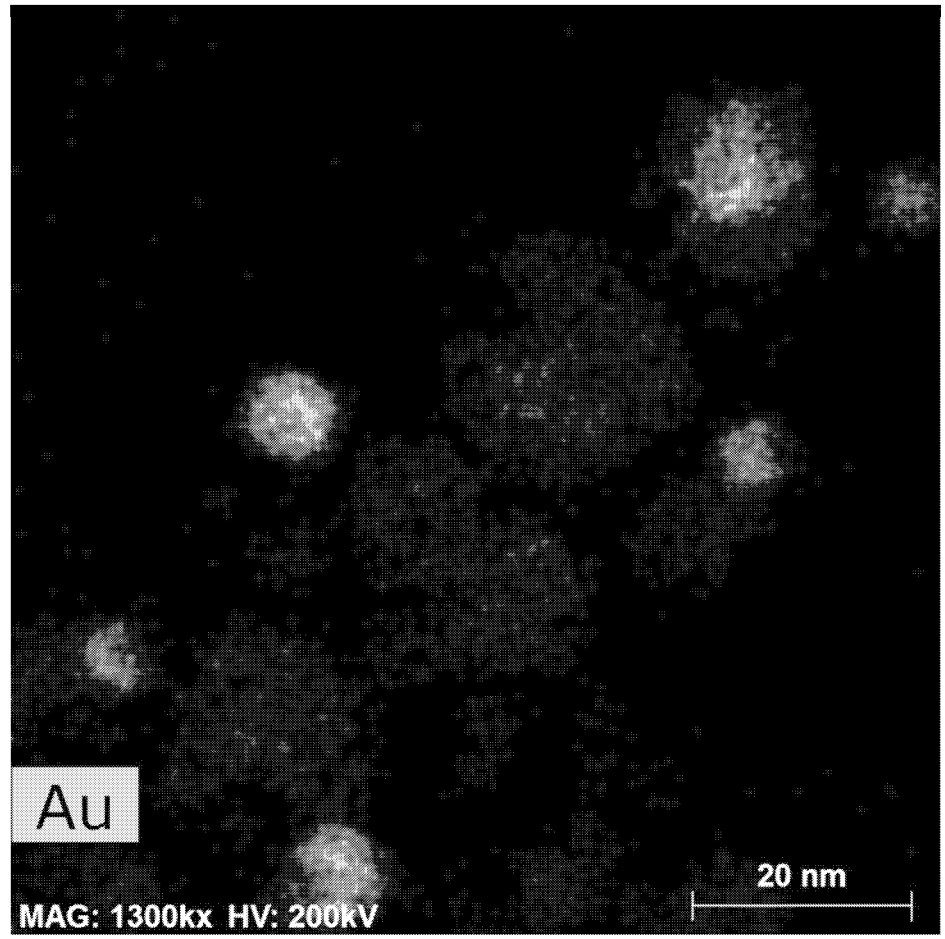
Figure 4D:
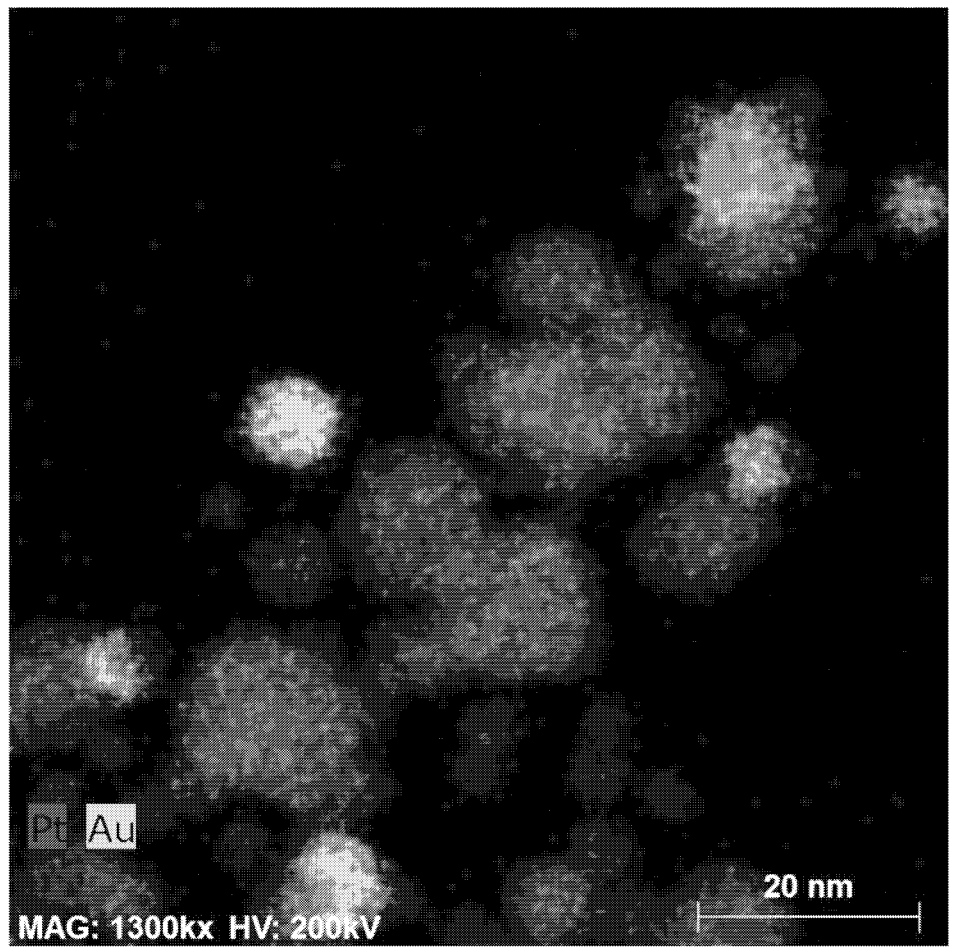

Exemplary embodiments of the present invention will now be described in detail with reference to the accompanying drawings.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

Definition of Terms

As used herein, the term "galvanic replacement reaction" refers to a spontaneous reaction as a kind of oxidation/reduction reaction in which a metal and a metal ion exchange electrons with each other, and a process in which metals having different ionization tendency, for example, copper (Cu) is immersed in a solution containing silver (Ag) ions such that the copper is oxidized and eluted, and silver ions are reduced and precipitated on a copper surface to form a silver plating, is referred to as a galvanic replacement reaction.

As used herein, the term "secondary metal" refers to a metal which has a different ionization tendency from that of a transition metal and in which a galvanic replacement reaction may occur.

As used herein, the term "room temperature" refers to a temperature in a natural state that is not heated or cooled, and is a temperature of 20±5° C.

It will be further understood that the terms "comprising," "including," and "having" and the derivatives thereof as used herein, though these terms are particularly disclosed or not, are not intended to preclude the presence or addition of optional components, steps, or processes. In order to avoid any uncertainty, all materials and methods claimed by using the term "comprising" may include optional additional additives, auxiliaries, or compounds, including a catalyst or any other materials, unless otherwise described. In contrast, the term "consisting essentially of" excludes unnecessary ones for operation and precludes optional other components, steps or processes from the scope of optional continuous description. The term "consisting of" precludes optional components, steps or processes, which are not particularly described or listed.

[Measurement Methods and Conditions]

In the present specification, "electrochemical specific activity" and "electrochemical mass activity" are obtained by dispersing 0.005 g of a catalyst into a mixture solution of a Nafion solution (5 wt %) and isopropyl alcohol (IPA) to prepare a catalyst ink, dropping and drying the catalyst ink onto a rotating disk electrode (19.6 mm$^2$) to prepare a working electrode, using a SCE electrode as a reference electrode and a platinum wire as a counter electrode, putting the prepared three-phase electrode into a 0.1 M HClO$_4$ electrolyte solution, saturating the three-phase electrode with oxygen, and measuring activities at a scan rate of 5 mV/sec, a voltage range of 0.05-1.05 V (vs. RHE), and a rotation rate of 1,600 rpm.

Fuel Cell Catalyst

The present disclosure provides a fuel cell catalyst having excellent redox reaction activity due to an increased active area of electrochemical reaction and improved mass activity.

The fuel cell catalyst according to an embodiment of the present disclosure includes a conductive carrier, and core-shell nanoparticles supported on the carrier, in which the core includes platinum and a transition metal, the shell includes a secondary metal, an electrochemical specific activity measured at a voltage of 0.05 V to 1.05 V (vs. RHE) in a potential range, at a scan rate of 5 mV/s and a rotation rate of 1,600 rpm in an $O_2$-saturated 0.1 M $HClO_4$ electrolyte solution is 0.3 mA/cm$^2$ to 0.6 mA/cm$^2$.

In addition, the fuel cell catalyst may have an electrochemical mass activity of 0.05 mA/μg to 0.08 mA/μg measured at a voltage of 0.05 V to 1.05 V (vs. RHE) in a potential range, at a scan rate of 5 mV/s and a rotation rate of 1,600 rpm in an $O_2$-saturated 0.1 M $HClO_4$ electrolyte solution.

Particularly, the fuel cell catalyst may have an electrochemical specific activity of 0.4 mA/cm$^2$ to 0.6 mA/cm$^2$ and a mass activity of 0.06 mA/μg to 0.08 mA/μg measured at a voltage of 0.05 V to 1.05 V (vs. RHE) in a potential range, at a scan rate of 5 mV/s and a rotation rate of 1,600 rpm in an $O_2$-saturated 0.1 M $HClO_4$ electrolyte solution.

In accordance with an embodiment of the present disclosure, the fuel cell catalyst is prepared by a preparation method including a galvanic replacement reaction including a post-treatment step for removing secondary metal nanocrystals or a pretreatment step of acid treatment, which will be described later, and thus under the driving conditions of the fuel cell, elution of a transition metal into the surface of the catalyst is suppressed, the secondary metal nanocrystals remaining on the surface thereof may be reduced, an active area of an electrochemical reaction is increased, a mass activity is improved, and thus the redox reaction activity is excellent.

The conductive carrier may be used without particular limitation as long as it is a conductive support commonly known as a support of core-shell nanoparticles, but may be, for example, one or more selected from the group consisting of a carbon support and a metal oxide, and specifically one or more selected from the group consisting of carbon black, Ketjen black, and metal oxide (ITO, Nb doped $TiO_2$, $Ti_4O_7$, AZO).

The core-shell nanoparticles may include a core including a platinum-transition metal, and a shell including a secondary metal formed to surround the core, in which the core-shell nanoparticles may have a diameter of 3 nm to 6 nm and the shell may have a thickness of 0.3 nm to 1.0 nm. If the thickness of the shell is less than the above range, the transition metal present in the core may be eluted, thereby causing corrosion, and if the thickness of the shell is greater than the above range, the performance of the catalyst may be deteriorated.

In addition, the transition metal is not particularly limited as long as it is commonly known in the art, but may be one or more selected from the group consisting of cobalt (Co), nickel (Ni), copper (Cu), and iron (Fe). Preferably, the transition metal may be one or more selected from the group consisting of cobalt and copper.

In addition, the secondary metal is not particularly limited as long as it is capable of smoothly performing a galvanic replacement reaction with the transition metal, but may be one or more selected from the group consisting of gold (Au), silver (Ag), platinum (Pt), palladium (Pd), and iridium (Ir). Preferably, the secondary metal may be one or more selected from the group consisting of gold and silver.

In addition, the fuel cell catalyst may have an atomic ratio content of the transition metal of 10-30 parts by weight, or 15-25 parts by weight, preferably 20 parts by weight, based on 100 parts by weight of the platinum atomic ratio content in the core. If the atomic ratio of the transition metal is less than the above range, the content of the transition metal capable of increasing the activity of the platinum may be insufficient, resulting in a decrease in electrochemical activity, and if the atomic ratio of the transition metal is greater than the above range, the adsorption force of the platinum with respect to the oxygen species may be excessively reduced, resulting in a decrease in electrochemical activity, or the transition metal may be exposed to the surface of the catalyst to cause elution from the surface, resulting in a decrease in electrochemical activity.

Method for Preparing Fuel Cell Catalyst

Furthermore, the present disclosure provides a method for preparing the fuel cell catalyst.

The method for preparing a fuel cell catalyst according to an embodiment of the present includes the steps of: preparing a core-carrier particle dispersion solution by dispersing, in an organic solvent, core-carrier particles in which a core containing platinum and a transition metal is supported on a conductive carrier and stirring the dispersed solution under a reducing gas atmosphere (S1); performing a galvanic replacement reaction by mixing the core-carrier particle dispersion solution with a secondary metal precursor solution (S2); and washing and drying the mixture and then heat-treating under a reducing gas atmosphere (S3), wherein the galvanic replacement reaction of the step (S2) is performed by a step of: preparing the core-carrier particle dispersion solution into an acidic dispersion solution having a pH of 2 to 5 and then stirring and mixing the solution with a secondary metal precursor solution (S2-1); or preparing a core-shell nanoparticle-containing dispersion solution by stirring and mixing the core-carrier particle dispersion solution with the secondary metal precursor solution and then washing and drying the core-shell nanoparticle-containing dispersion solution and then heat-treating to prepare primary core-shell nanoparticles, and then dispersing the primary core-shell nanoparticles in an acidic solution having a pH of 2 to 5 (S2-2).

Step (S1)

The step (S1) is a step of preparing a core-carrier particle dispersion solution in which oxygen species is removed from the surface thereof, and may be performed by dispersing, in an organic solvent, core-carrier particles in which a core containing platinum and a transition metal is supported in a conductive carrier and stirring the dispersed solution in a reducing gas atmosphere.

The organic solvent is not particularly limited as long as it is commonly known in the art, but may be one or more selected from the group consisting of ethanol, anhydrous ethanol, methanol, isopropyl alcohol, acetone, and dimethylformamide.

In addition, the dispersion in the step (S1) may be performed through an ultrasonic treatment, and specifically, the dispersion may be performed by adding core-carrier particles into an organic solvent, performing an ultrasonic treatment for 30 minutes to 1 hour to disperse the core-carrier particles, and then stirring the dispersed solution for 30 minutes to 1 hour.

In addition, the reducing gas atmosphere is an environment in which oxygen species in the dispersion solution may be removed, and may be formed by injecting, for example, hydrogen, argon, or a mixture gas thereof.

In addition, the core-carrier particle may be prepared by mixing and reacting an organic solution in which a conductive carrier is dissolved, and a metal precursor organic solution in which a platinum precursor and a transition metal precursor are dissolved, and washing and drying the mixture.

Here, since the conductive carrier has been described above, a description thereof will be omitted.

The platinum precursor is not particularly limited as long as it is known in the art, but may be one or more compounds selected from the group consisting of $H_2PtCl_6$, $H_2PtCl_4$, $K_2PtCl_6$, $K_2PtCl_4$, and $PtCl_2(NH_3)_4$.

In addition, the transition metal precursor is not particularly limited as long as it is known in the art, but may be one or more compounds selected from the group consisting of a nitride, a chloride, a sulfide, an acetate, an acetylacetonate, a cyanide, and a hydrate of the transition metal.

The organic solution in which the conductive carrier is dissolved and the metal precursor organic solution may be prepared by adding and dissolving the conductive carrier and the metal precursor into an organic solvent, respectively.

Step (S2)

The step (S2) is a step of forming a shell including a secondary metal on a core including platinum and a transition metal, and may be performed by mixing a secondary metal precursor solution with the core-carrier particle dispersion solution prepared in the step (S1) and performing a galvanic replacement reaction. In this case, the galvanic replacement reaction may be performed at room temperature.

The secondary metal precursor solution may be prepared by adding and dissolving the secondary metal precursor into an organic solvent, and the secondary metal precursor may be one or more compounds selected from the group consisting of a nitride, a chloride, a sulfide, an acetate, an acetylacetonate, a cyanide, and a hydrate of the secondary metal.

In the present disclosure, the galvanic replacement reaction in the step (S2) may be performed via the following two different steps.

Step (S2-1)

The step (S2-1) may be performed by preparing the core-carrier particle dispersion solution into an acidic dispersion solution having a pH of 2 to 5, and then stirring and mixing the solution with a secondary metal precursor solution.

The acidic dispersion solution may be prepared by adding an acid to the core-carrier particle dispersion solution under a reducing gas atmosphere, and in this case, the acid may be appropriately used in an amount such that the pH of the acidic dispersion solution becomes 2 to 5, specifically, 2 to 3.

Here, the acid is not particularly limited as long as it can form the pH, and a material generally classified as an acid may be used, and the acid may be, for example, an inorganic acid such as hydrochloric acid, nitric acid, sulfuric acid, or perchloric acid, or an organic acid such as acetic acid, oxalic acid, tartaric acid, or benzoic acid, and preferably hydrochloric acid.

In this case, the formation of the secondary metal on the surface of the catalyst as an independent crystal may be suppressed by creating an acidic environment before the galvanic replacement reaction.

The stirring may be performed at room temperature for 12 hours to 24 hours.

Step (S2-2)

The step (S2-2) may be performed by stirring and mixing the core-carrier particle dispersion solution and the secondary metal precursor solution to prepare a core-shell nanoparticle-containing dispersion solution, washing and drying the core-shell nanoparticle-containing dispersion solution and then heat-treating to prepare primary core-shell nanoparticles, and then dispersing the primary core-shell nanoparticles in an acidic solution having a pH of 2 to 5.

Here, the acidic solution may be a solution adjusted to the pH by mixing distilled water or alcohol with an acid, and the acid may be an inorganic acid such as hydrochloric acid, nitric acid, sulfuric acid, or perchloric acid, or an organic acid such as acetic acid, oxalic acid, tartaric acid, or benzoic acid, and preferably acetic acid.

More specifically, the acidic solution may be a solution in which acetic acid is dissolved in alcohol in 1 M to 3 M.

The stirring may be performed at room temperature for 12 hours to 24 hours.

In this case, the secondary metal crystal independently formed on the surface of the catalyst may be removed by performing the acid treatment after the galvanic replacement reaction.

Step (S3)

The step (S3) is a step of washing, drying, and heat-treating the mixture to obtain a fuel cell catalyst.

The washing and drying may be performed by a method commonly known in the art, for example, the washing may be performed by adding alcohol and distilled water, and the drying may be performed at a temperature of 20° C. to 100° C. for 1 hour to 5 hours.

In addition, the heat-treating may be performed by a method commonly known in the art, for example, may be performed at a temperature of 300° C. to 900° C. for 2 hours to 8 hours under a reducing gas atmosphere.

Fuel Cell

Furthermore, the present disclosure provides a fuel cell including the fuel cell catalyst.

The fuel cell according to an embodiment of the present disclosure includes: a positive electrode; a negative electrode facing the positive electrode; and an electrolyte membrane located between the positive electrode and the negative electrode, wherein at least one among the positive electrode and the negative electrode includes the fuel cell catalyst.

The fuel cell of the present disclosure includes a catalyst having improved mass activity and excellent redox reaction activity as a catalyst layer of either the positive electrode or the negative electrode, thereby having excellent electrochemical reaction.

EXAMPLES

Hereinafter, the present invention will be described in more detail according to examples. However, the example according to the present invention may be modified in many different forms, and the scope of the present invention should not be interpreted to be limited to the examples described below. Rather, the example of the present disclosure is provided so that this description will be thorough and complete, and will fully convey the scope of the present disclosure to those skilled in the art.

Example 1

A carbon-supported platinum-cobalt nanoparticle core (0.1 g, TEC36E52, TKK, Ltd.) was added to 180 mL of anhydrous ethanol and subjected to an ultrasonic treatment for 30 minutes, and the mixture was further stirred for 30 minutes. Then, the mixture was further stirred for 1 hour in a hydrogen/argon (5/95 wt %) gas atmosphere.

A silver precursor solution (0.007 g of silver precursor (silver acetate) dissolved in 20 mL of anhydrous ethanol) was added thereto, and the mixture was stirred at room temperature for 12 hours. Then, the mixture was washed with ethanol and distilled water, dried in a 70° C. oven for 3 hours, and heat-treated at 400° C. for 2 hours in a hydrogen/argon (5/95 wt %) gas atmosphere to prepare primary core-shell nanoparticles.

The prepared primary core-shell nanoparticles were dispersed in 1 M acetic acid/ethanol solution, stirred for 12 hours, washed with ethanol and distilled water, dried at room temperature, and then heat-treated again at 400° C. for 2 hours in a hydrogen/argon (5/95 wt %) gas atmosphere to prepare a fuel cell catalyst.

Example 2

A carbon-supported platinum-cobalt nanoparticle core (0.1 g, TEC36E52, TKK, Ltd.) was added to 180 mL of anhydrous ethanol and subjected to an ultrasonic treatment for 30 minutes, and the mixture was further stirred for 30 minutes. Then, a dispersion solution having pH 2 was prepared by adding a hydrochloric acid while stirring the mixture in an argon gas atmosphere.

A gold precursor solution (0.017 g of gold precursor ($HAuCl_4 \cdot xH_2O$) dissolved in 100 mL of anhydrous ethanol) was slowly added thereto at 24 mL/hr using a syringe pump, and the mixture was stirred at room temperature for 12 hours. Then, the mixture was washed with ethanol and distilled water, dried in a 70° C. oven for 3 hours, and heat-treated at 400° C. for 2 hours in a hydrogen/argon (5/95 wt %) gas atmosphere to prepare a fuel cell catalyst.

Comparative Example 1

A carbon-supported platinum-cobalt nanoparticle core (0.1 g, TEC36E52, TKK, Ltd.) was added to 180 mL of anhydrous ethanol and subjected to an ultrasonic treatment for 30 minutes, and the mixture was further stirred for 30 minutes. Then, the mixture was further stirred for 1 hour in a hydrogen/argon (5/95 wt %) gas atmosphere.

A silver precursor solution (0.007 g of silver precursor (silver acetate) dissolved in 20 mL of anhydrous ethanol) was added thereto, and the mixture was stirred at room temperature for 12 hours. Then, the mixture was washed with ethanol and distilled water, dried in a 70° C. oven for 3 hours, and heat-treated at 400° C. for 2 hours in a hydrogen/argon (5/95 wt %) gas atmosphere to prepare a fuel cell catalyst.

Comparative Example 2

A carbon-supported platinum-cobalt nanoparticle core (0.1 g, TEC36E52, TKK, Ltd.) was added to 180 mL of anhydrous ethanol and subjected to an ultrasonic treatment for 30 minutes, and the mixture was further stirred for 30 minutes. Then, the mixture was further stirred for 1 hour in a hydrogen/argon (5/95 wt %) gas atmosphere.

A gold precursor solution (0.017 g of gold precursor ($HAuCl_4 \cdot xH_2O$) dissolved in 20 mL of anhydrous ethanol) was added thereto, and the mixture was stirred at room temperature for 12 hours. Then, the mixture was washed with ethanol and distilled water, dried in a 70° C. oven for 3 hours, and heat-treated at 400° C. for 2 hours in a hydrogen/argon (5/95 wt %) gas atmosphere to prepare a fuel cell catalyst.

Experimental Example 1

The fuel cell catalysts prepared in Examples and Comparative Examples were observed using a transmission electron microscope (TEM), and the results are shown in FIGS. 1 to 4.

Each fuel cell catalyst was dispersed in ethanol to prepare a sample. In this case, all the samples were prepared by dispersing the same amount of catalyst in the same amount of ethanol.

The prepared sample was dropped on a TEM grid (Holey carbon-Cu 200 mesh, 50 micron), dried at room temperature to prepare a specimen, and a TEM image was measured at a magnification of 1.3 million times using a Talos F200X equipment.

Referring to FIGS. 1 and 3, the fuel cell catalysts of Examples 1 and 2 were confirmed that silver or gold particles were uniformly applied on the surface of the platinum-cobalt core.

On the other hand, as shown in FIGS. 2 and 4, the fuel cell catalysts of Comparative Examples 1 and 2 were confirmed that gold or silver independently formed crystals (agglomeration) on the surface of the platinum-cobalt core, and the distribution thereof was also uneven.

Thus, the method according to the present disclosure which includes a galvanic replacement reaction including a removal step of secondary metal nanocrystals on the surface or a pretreatment step of acid treatment may be confirmed that a fuel cell catalyst, in which the galvanic replacement reaction effectively occurs to uniformly form the shell and the independent secondary metal nanocrystals remaining on the surface is reduced, may be prepared.

Experimental Example 2

Oxygen reduction reaction (ORR) characteristics of the fuel cell catalysts prepared in Examples and Comparative Examples were evaluated.

Each prepared catalyst (0.005 g) was dispersed in a mixed solution of a Nafion solution (5 wt %) and isopropyl alcohol (IPA) to prepare a catalyst ink. The catalyst ink was dropped on a rotating disk electrode (19.6 mm$^2$) and then dried to evaporate the alcohol to prepare a working electrode.

A SCE electrode was used as a reference electrode, a platinum wire was used as a counter electrode, and all the analyses were performed at room temperature.

The prepared three-phase electrode was put in a 0.1 M $HClO_4$ electrolyte solution, saturated with oxygen, and oxygen gas was continuously supplied during the analysis. Specific activity, mass activity, and half-wave potential of the catalyst were measured at a scan rate of 5 mV/sec, a voltage range of 0.05-1.05 V (vs. RHE), and a rotation rate of 1,600 rpm. The results are shown in Table 1 below and in FIGS. 5 to 7.

TABLE 1

| Division | Mass activity (mA/μg) | Specific activity (mA/cm$^2$) | Half-wave potential (mV) |
| --- | --- | --- | --- |
| Example 1 | 0.069 | 0.56 | 929 |
| Example 2 | 0.066 | 0.33 | 928 |
| Comparative | 0.038 | 0.29 | 903 |

TABLE 1-continued

| Division | Mass activity (mA/μg) | Specific activity (mA/cm$^2$) | Half-wave potential (mV) |
|---|---|---|---|
| Example 1 | | | |
| Comparative Example 2 | 0.045 | 0.33 | 915 |

Figure 7:
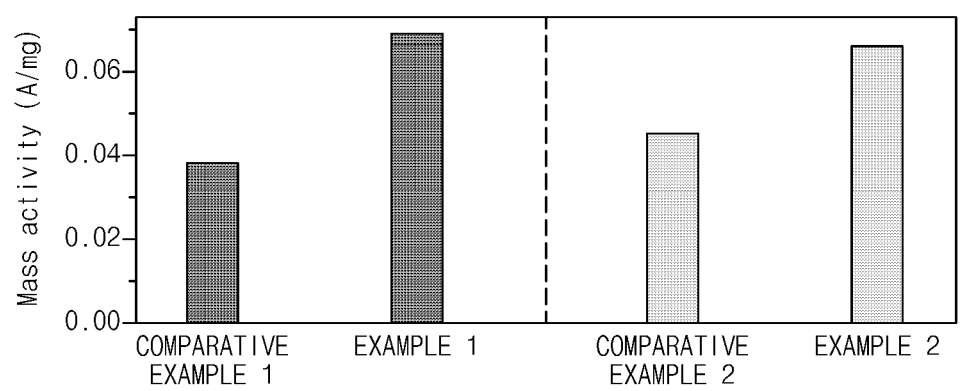
FIG. 7 is a graph showing mass activity of the fuel cell catalysts of Example 1, Example 2, Comparative Example 1 and Comparative Example 2.

As confirmed in Table 1 and FIG. 7, Example 1 and Example 2 show a mass activity of at least 0.05 mA/μg and a specific activity of 0.3 mA/cm$^2$, which are significantly increased as compared with Comparative Examples 1 and 2.

Figure 5:
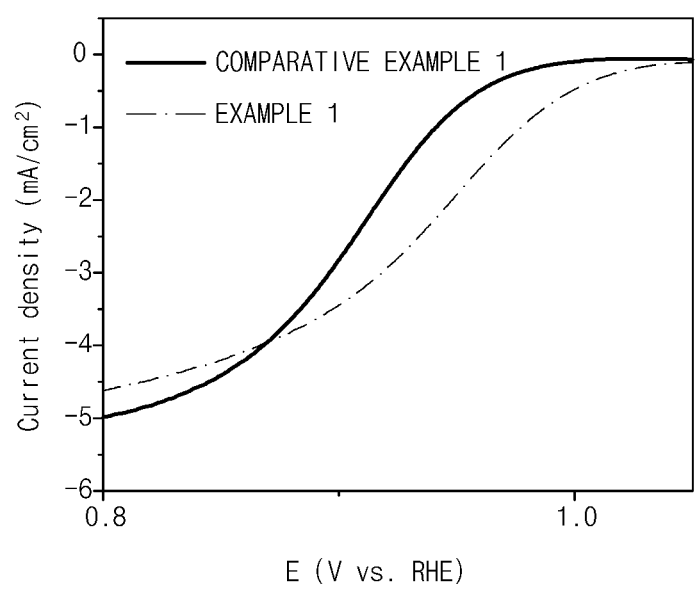
FIG. 5 is a current-voltage graph of the fuel cell catalysts of Example 1 and Comparative Example 1.
Figure 6:
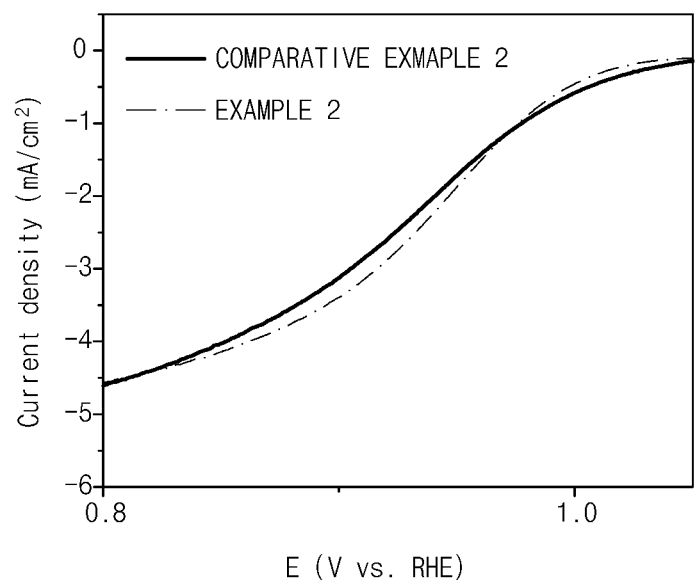
FIG. 6 is a current-voltage graph of the fuel cell catalysts of Example 2 and Comparative Example 2.

In addition, as shown in Table 1, FIG. 5, and FIG. 6, it was confirmed that Example 1 and Example 2 have higher onset potential and half-wave potential as compared with Comparative Examples 1 and 2.

Meanwhile, the onset potential and the half-wave potential are important criteria by which the oxygen reduction reaction activity of the catalyst can be known, and the onset potential refers to a voltage of a part at which the oxygen reduction reaction of the catalyst starts. If the catalyst shows the higher onset potential and higher half-wave potential, the more excellent electrochemical activity it has.

The fuel cell catalyst of the present disclosure has effects in that when the fuel cell is driven, elution of a transition metal into the surface of the catalyst is suppressed, secondary metal nanocrystals remaining on the surface thereof are reduced such that an active area of an electrochemical reaction is increased, and thus a mass activity is improved, thereby showing excellent oxygen reduction reaction activity.

Also, the method for preparing a fuel cell catalyst of the present disclosure can prepare a fuel cell catalyst having excellent activity by including a galvanic replacement reaction including a removal step of secondary metal nanocrystals on the surface or a pretreatment step of acid treatment.

In addition, the fuel cell of the present disclosure includes a catalyst having improved mass activity and excellent redox reaction activity as a catalyst layer of either the positive electrode or the negative electrode, thereby having excellent electrochemical reaction.

While the present invention has been shown and described in connection with the exemplary embodiments, it will be apparent to those skilled in the art that modifications and variations can be made without departing from the spirit and scope of the invention as defined by the appended claims.

What is claimed is:

1. A fuel cell catalyst comprising:
a conductive carrier; and
core-shell nanoparticles supported on the carrier,
wherein the core includes platinum and a transition metal,
the shell includes a secondary metal,
an electrochemical specific activity measured at a voltage of 0.05 V to 1.05 V (vs. RHE) in a potential range, at a scan rate of 5 mV/s and a rotation rate of 1,600 rpm in an O$_2$-saturated 0.1 M HClO$_4$ electrolyte solution is 0.3 mA/cm$^2$ to 0.6 mA/cm$^2$, and
a mass activity is 0.05 mA/μg to 0.08 mA/μg.

2. The fuel cell catalyst of claim 1, wherein the transition metal is one or more selected from the group consisting of cobalt (Co), nickel (Ni), copper (Cu), and iron (Fe).

3. The fuel cell catalyst of claim 1, wherein the secondary metal is one or more selected from the group consisting of silver (Ag), gold (Au), palladium (Pd), and iridium (Ir).

4. The fuel cell catalyst of claim 1, wherein the conductive carrier is one or more selected from the group consisting of carbon black, Ketjen black, and metal oxide.

5. The fuel cell catalyst of claim 1, wherein the core-shell nanoparticles have a diameter of 3 nm to 6 nm and the shell has a thickness of 0.3 nm to 1.0 nm.

6. The fuel cell catalyst of claim 1, wherein the fuel cell catalyst has an electrochemical specific activity of 0.4 mA/cm$^2$ to 0.6 mA/cm$^2$ and a mass activity of 0.06 mA/μg to 0.08 mA/μg measured at a voltage of 0.05 V to 1.05 V (vs. RHE) in a potential range, at a scan rate of 5 mV/s and a rotation rate of 1,600 rpm in an O$_2$-saturated 0.1 M HClO$_4$ electrolyte solution.

7. A fuel cell comprising:
a positive electrode;
a negative electrode facing the positive electrode; and
an electrolyte membrane located between the positive electrode and the negative electrode,
wherein at least one among the positive electrode and the negative electrode includes the fuel cell catalyst of claim 1.

* * * * *